United States Patent Office 2,874,801
Patented Feb. 24, 1959

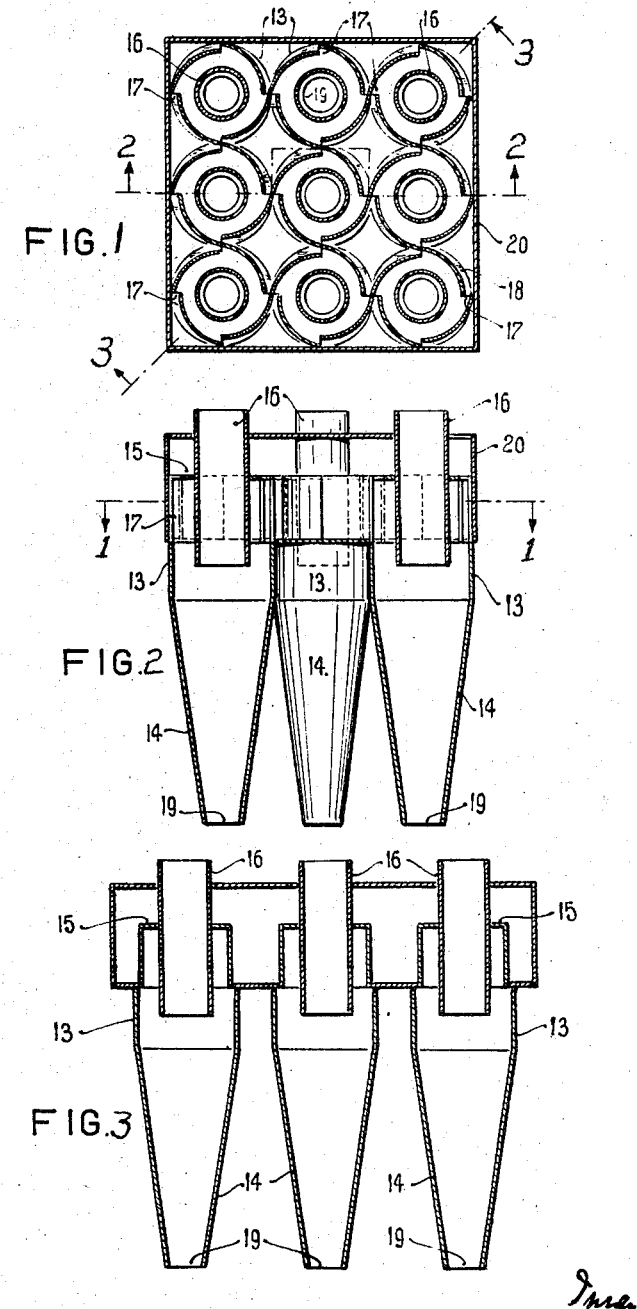

2,874,801

DUST-SEPARATORS CONSISTING OF A SET OF CYCLONES CONNECTED IN PARALLEL AND HAVING EACH AT LEAST ONE TANGENTIAL INLET OPENING

Hendrik van der Kolk, Heemstede, Netherlands, assignor to Bureau van Tongeren N. V., Heemstede, Netherlands, a company of the Netherlands Application November 18, 1955, Serial No. 547,718

Claims priority, application Netherlands December 9, 1954

1 Claim. (Cl. 183—83)

This invention relates to apparatus for separating suspended particles from a gaseous medium.

In a set of cyclones of the type contemplated by the present invention, the cyclones are arranged as closely together as possible in order to save room. With previously employed structures, the preferred arrangement in which each cyclone has a tangentially connected conduit for the dust-laden air is impossible, since such conduits would require too much room between the cyclones, and therefore a connection is used permitting, owing to the provision of an axial inlet opening and oblique blades mounted in such opening, the dust-laden air to enter each cyclone both with a tangential and a considerable dust-separation-affecting axial component of velocity.

When in the description and the claim reference is made to the separation of dust from gas, also the separation of liquid particles from gas and the separation of dust from liquid are meant.

The invention has for its object to combine a compact construction of the set of cyclones with an almost true tangential supply of the individual cyclones. It consists in that the inlet openings of the cyclones open directly into the spaces left between the cyclones and between the cyclones and a casing surrounding them, said spaces being closed at one end and communicating with the conduit for the supply of the dust-laden gas.

For the elucidation of the invention, reference is made to the accompanying drawings, wherein:

Figure 1 is a horizontal cross-sectional view taken through a set of cyclones according to the present invention, said view being taken on line 1—1 of Figure 2.

Figure 2 is a vertical cross sectional view taken on line 2—2 of Figure 1.

Figure 3 is a vertical cross-sectional view taken on line 3—3 of Figure 1.

Referring to the drawings, the set of cyclones consists of a flat square distributing box 20, closed on its lower side, in which are provided nine equally sized cyclones arranged in rows and columns of three cyclones each. Said cyclones are placed in close contact with each other and with the upstanding front, rear and side walls of said box.

Each cyclone consists of a generally cylindrical upper shell 13 and a downwardly tapering lower conduit portion 14 merging with the shell and being open at its bottom end 19. Each cyclone has a top wall 15 and an outlet conduit 16 mounted axially in the cylindrical upper shell of the cylone and extending through its top wall 15. The outlet conduits 16 also extend through the top wall of the casing 20. The outlet conduits 16 communicate at their lower ends with the tapering lower conduit portions 14.

The cylindrical upper shells 13 of the cyclones extend through the bottom wall of the casing 20 and define separating chambers therebetween, and between the upper shells and the front, rear and side walls of the casing 20.

Each upper shell 13 is provided with four tangential inlet openings 17 at the same level and equally spaced apart circumferentially, each inlet opening having a crescent-shaped bottom wall 18 and being formed by a wall segment of the shell defined by two axially extending straight edges and by a lower and upper arcuate edge, the upper arcuate edge being located at the top wall 15 of the cyclone and the lower arcuate edge being located at the intermediate portion of the cylindrical upper shell 13, the segments being offset relative to the lower portion of the shell so that the radial distance to one axially extending edge of each inlet opening 17 exceeds the radial distance to the other axially extending edge thereof. The outer axially extending edges of the center cyclone engage the outer axially extending edges of each of the four cyclones adjacent thereto, and the outer axially extending edges of the marginal cyclones engage the front, rear and side walls of the casing 20, whereby the cyclones define with each other and with the walls of the casing chambers communicating at their top ends over the top walls of the cyclones.

An inlet conduit is provided at a wall of casing 20, said inlet conduit communicating with the spaces defined by the cyclones at said wall and also communicating with the tangential inlet openings of said cyclones. The inlet conduit likewise communicates with the remaining spaces defined by the cyclones in casing 20 and with the tangential inlet openings of the remaining cyclones through the space in the casing defined above the top walls 15 of the cyclones.

As shown, the box 20 encloses only those parts of the cylindrical shells 13 containing the tangential inlet openings 17.

In operation, dust-laden gas entering through the inlet conduit flows into the spaces, closed on their bottom sides by the bottom wall of casing 20, and defined between the individual cyclones and between the latter and the front, rear and side walls of the distributing box 20. From each of said spaces the gas flows almost tangentially into the cyclones through the inlet openings 17 and is relieved of dust. The separated dust leaves the cyclones through the mouths 19 of their tapering conduit portions 14. The purified gas passes upwardly through the discharge conduits 16.

What I claim is:

Apparatus for separating suspended particles from a gaseous medium comprising a rectangular casing having front and rear walls, side walls, top and bottom walls, and an inlet conduit, a plurality of equally sized cyclones disposed in said casing with the marginal cyclones contacting the front, rear and side walls of said casing and arranged in rows extending parallel to one another from the front wall of the casing to the rear wall of the casing, each cyclone comprising a generally cylindrical upper shell and a downwardly tapering lower conduit portion merging with the shell and being open at its bottom end, each cyclone having a top wall, the cyclones extending through the bottom wall of the casing and defining separating chambers, outlet conduits mounted axially in the cylindrical upper shells of the cyclones and extending through said top wall of the casing, said outlet conduits communicating with said tapering lower portions, each shell being provided at its upper portion with four tangential inlet openings at the same level and equally spaced apart circumferentially, each inlet opening being formed by a wall segment of the shell defined by two axially extending straight edges and by a lower and upper arcuate edge, the upper arcuate edge being located at the top wall of the cyclone and the lower arcuate edge being located at the intermediate portion of the cylindrical upper shell, the segments being offset relative to the lower portion of the shell so that the radial distance to one axially extending edge of each inlet opening exceeds the radial distance to the other axially extending edge thereof, the outer axially extending edges of each cyclone except the marginal cyclones engaging the outer axially extending edges of each of the four cyclones adjacent thereto, the cyclones being located in the casing so that they define with each other and with the walls of the casing chambers communicating with each other at their ends, and means communicatively connecting said inlet conduit to said tangential inlet openings.

References Cited in the file of this patent

UNITED STATES PATENTS

| | | |
|---|---|---|
| 2,281,610 | Watson et al. | May 5, 1942 |
| 2,696,895 | Phyl | Dec. 14, 1954 |
| 2,717,054 | Petersen | Sept. 6, 1955 |

FOREIGN PATENTS

| | | |
|---|---|---|
| 580,936 | Great Britain | Sept. 25, 1946 |
| 701,593 | Great Britain | Dec. 30, 1953 |